Sept. 1, 1970 R. D. COREY 3,526,471
HEAT GENERATING SYSTEM
Filed July 30, 1968 6 Sheets-Sheet 1

INVENTOR.
RONALD D. COREY
BY 
ATTORNEY

Fig. 2.

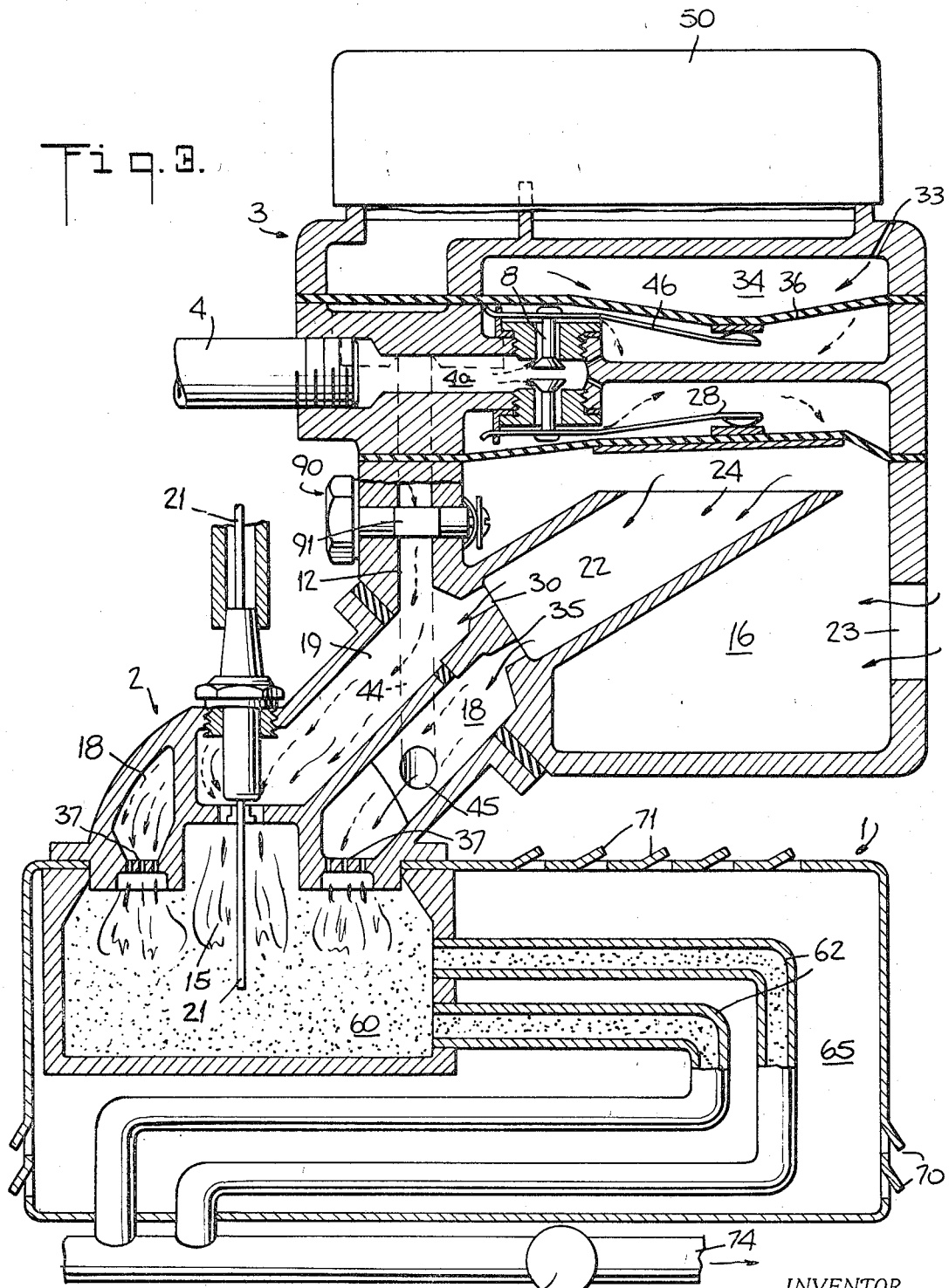

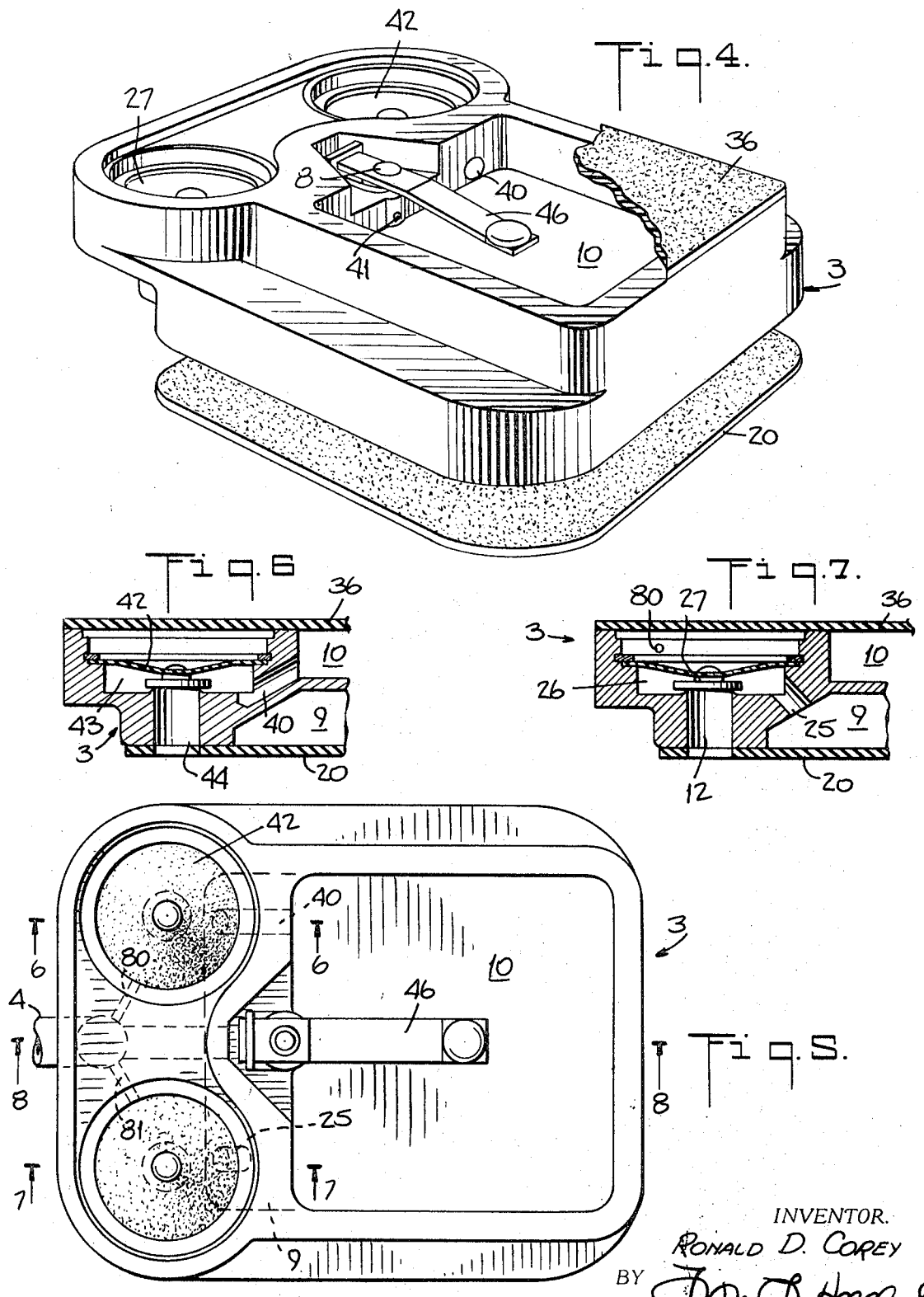

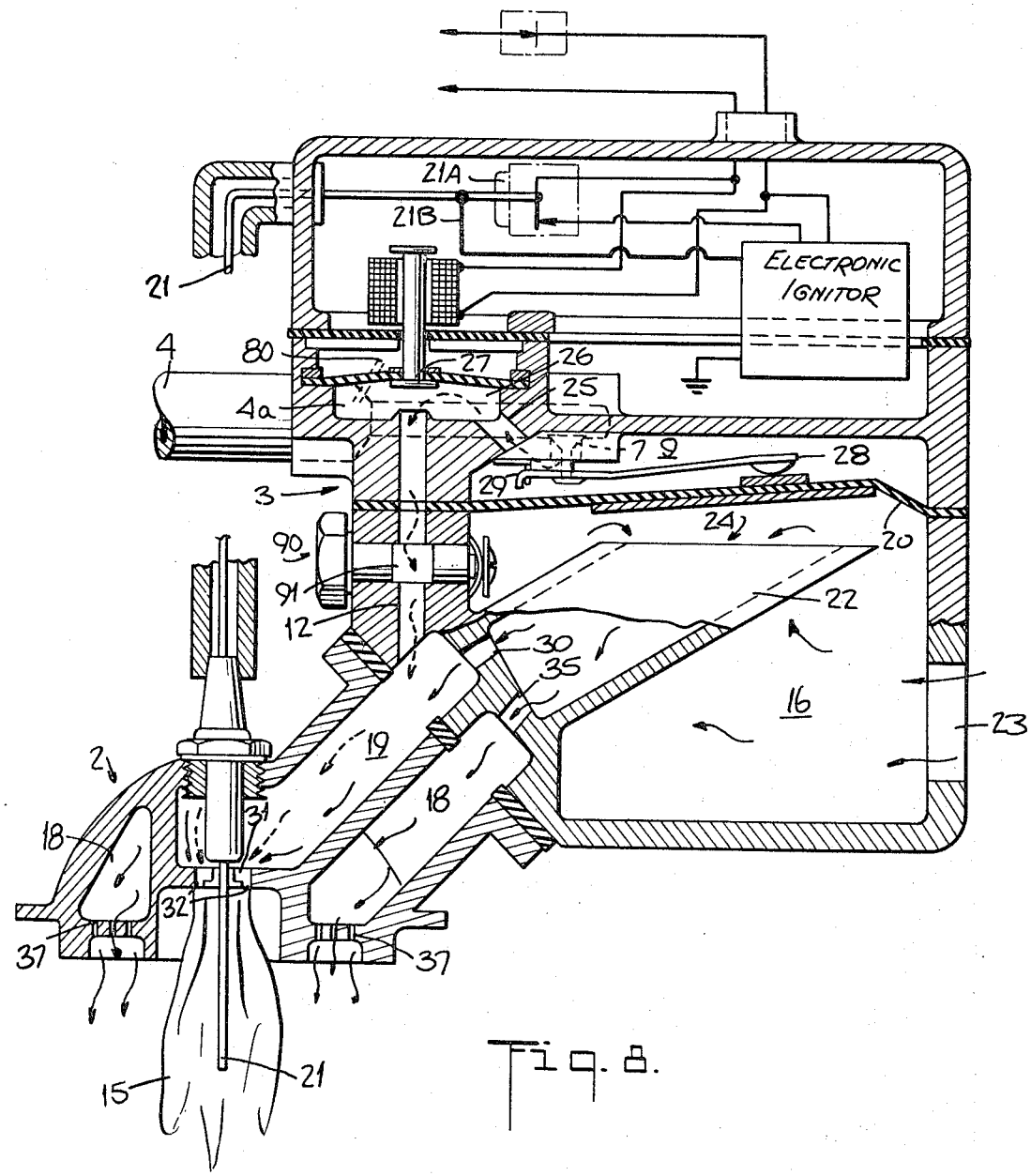

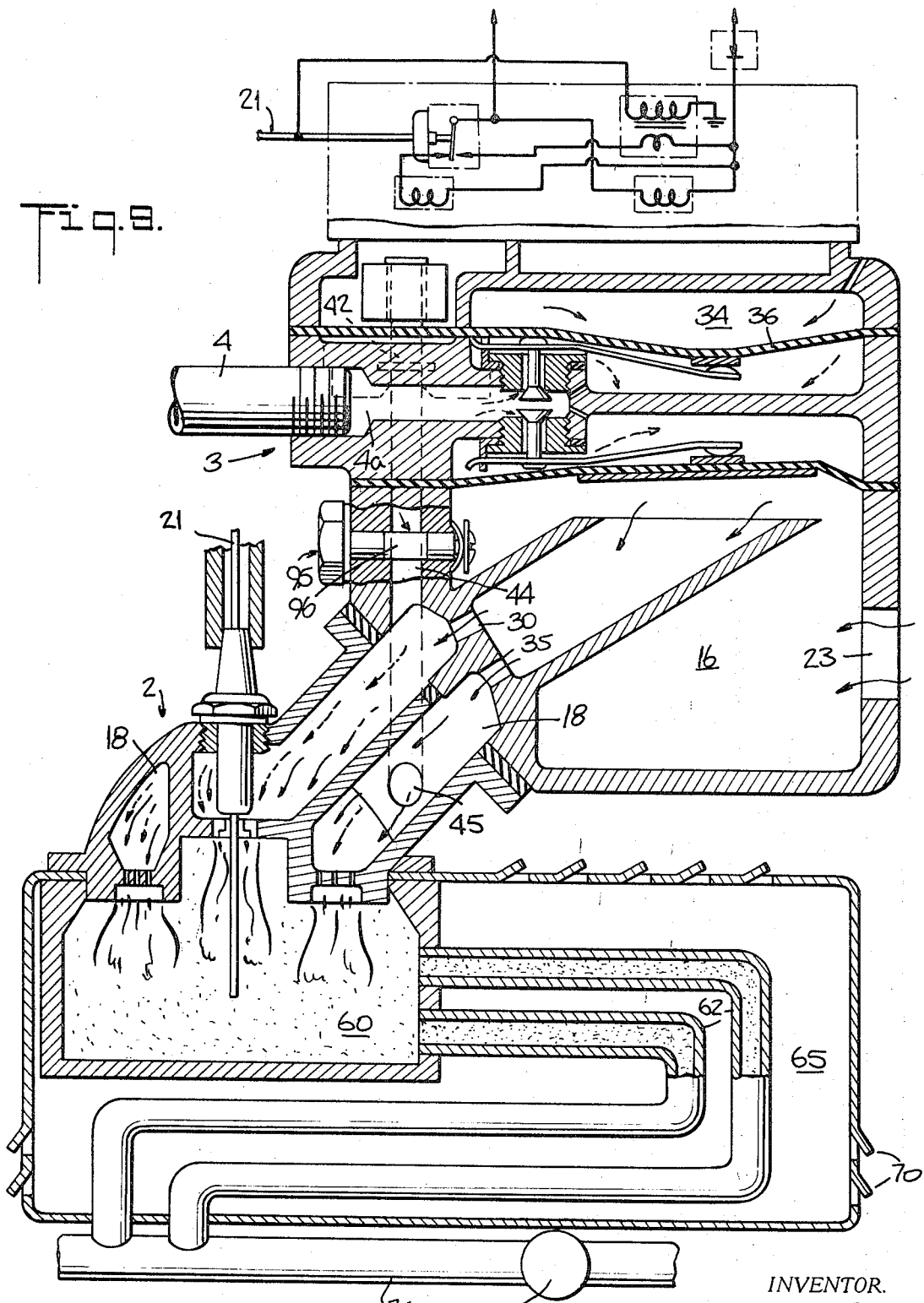

United States Patent Office 3,526,471
Patented Sept. 1, 1970

3,526,471
HEAT GENERATING SYSTEM
Ronald D. Corey, R.D. 1, Chenango Forks, N.Y. 13746
Filed July 30, 1968, Ser. No. 748,728
Int. Cl. F23n
U.S. Cl. 431—19       17 Claims

ABSTRACT OF THE DISCLOSURE

A heat generating system with an induced draft burner and control system comprising a set of fuel-mixing valves for both temperate and fast heat generation. A diaphragm valve operated by alternating pressure, above and below atmospheric pressure, is used to close the air inlet to the burner and is positioned in the wall of a fuel supply chamber. When the fuel supply chamber is placed under the sub-atmospheric pressure of the burner system initiating operation, the valve tends to collapse opening the air inlet and admitting air into the system. In addition the collapsing diaphragm opens a check valve admitting fuel to the system. Fluctuations in the fuel line and induced draft pressures will be compensated for by the action of the diaphragm and varies the regulating check valve opening so as to maintain a constant mixture of the fuel to air being supplied to the burner. The burner arrangement comprises a combustion chamber, a fuel mixing chamber and an auxiliary air chamber all evacuated to sub-atmospheric pressure by the induced draft produced at the outlet of the heat exchanger which is connected to the exit of the combustion chamber. Air and fuel are supplied to the mixing chamber, under the action of the diaphragm valve, and mixed therein and drawn into the combustion chamber and ignited for burning. The auxiliary air chamber communicates with the air inlet and has outlets communicating with the combustion chamber adjacent to the inlet of the ignited fuel mixture. Cooling air is drawn through the auxiliary chamber which has a tempering affect on the residual hot gases within the combustion chamber. A fast heating feature is optionally included by introducing fuel into the auxiliary air chamber under the control of a second diaphragm in the wall of a second fuel supply chamber.

DESCRIPTION

This invention relates in general to a heat generating system having a combination automatic fuel-mixing, an ignition system, and a burner device, and more particularly to a heat generating system with an induced draft fuel-mixing and electronic ignition control system, an explosion-proof burner device which operates in response to alternating pressure above and below that of the surrounding atmosphere.

In previous induced draft combustion control systems the various control switches utilized have been vacuum operated so as to sense vacuum presence within the burner and in turn complete a circuit to activate the fuel supply control valves. A separate set of manually adjusted valves were also used to regulate admission of combustion air to the mixing chamber. These systems thus required many components and connections which necessarily decreased their reliability and were not automatically responsive to variations of degrees of vacuum within the burner system.

Another particular problem in these induced draft burner systems is variation or fluctuation in the draft-produced sub-atmospheric pressure which accordingly causes fluctuations in the proportions of the fuel to air mixture and reduces the efficiency of this type of device. Many of these prior devices have been somewhat dangerous to operate, as their lack of sequential operation of the valves, results in a lack of reliable ignition of the fuel mixture and have resulted in explosions of the entire burner system.

The present invention embodies a combustion system with an explosion-proof electronic ignition system which incorporates control means for automatically modulating the fuel to air mixture in response to the varying induced draft pressures and provides for both temperate and fast heating within a compact and otherwise sealed burner structure. Fuel and air are admitted to the combustion chamber during burning periods only and are cut off from entry during idle periods irrespective of vacuum presence. The fuel-mixing control valves are pressure-operated check valves which depend upon vacuum existence within the combustion chamber in order to open so that the combustible mixture will be shut off automatically in the event of vacuum failure. A diaphragm valve is provided in the wall of a closed chamber which is normally maintained at fuel line pressure. When the burner receives a signal to ignite, the chamber is connected with the sub-atmospheric pressure by a suitable valve means and the diaphragm collapses into the chamber operating an appropriate valve to admit fuel through the chamber into the mixing chamber. The diaphragm valve also controls the opening of the air inlet in unison with the fuel valve, also it responds to fluctuations in the induced draft pressure which will thereby tend to increase or decrease the fuel supply by proportionately opening and closing the modulating fuel valve to maintain a constant ratio of fuel to air in the mixture to the burner.

In the burner excess air is supplied to the combustion chamber simultaneously with but separate from the main combustible gas to mingle with the residual combusted gases tempering their temperature. In the event of failure of the combustible mixture to ignite, the excess air will render the mixture non-combustible by dilution in the combustion chamber thus assuring against an explosive build-up. This auxiliary air may itself be mixed with the fuel to provide an auxiliary combustible mixture for a fast heating feature in the system.

It is therefore an object of the present invention to provide a heat generator with an induced draft combustible gas mixing device which automatically and mechanically regulates the ratio of fuel to air in the gas mixture.

It is another object of the present invention to provide a heat generator which is capable of both temperate and fast heating.

It is a further object of the present invention to provide a safe, explosion-proof heating apparatus.

It is a further object of the present invention to provide valve means which automatically and simultaneously open and close the fuel and air inlets to an induced draft burner device and automatically cut off their ingress upon shut down or vacuum failure. Also, a device that adds excess air for temperate temperature control under control of said valve means.

Other and further objects of the invention will be obvious upon an understanding of the illustrative embodiment about to be descirbed, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 2 is a showing similar to FIG. 1 of the heat generating system upon ignition of the burner device in the temperate heat generating condition;

FIG. 3 is a showing as in FIG. 2 with the burner device in the fast heat generating condition;

FIG. 4 is a perspective view of the fuel control system with portions broken away;

FIG. 5 is a top view of the control system shown in FIG. 4;

FIG. 6 is a sectional view taken along the lines 6—6 in FIG. 5;

FIG. 7 is a sectional view taken along the lines 7—7 in FIG. 5;

FIG. 8 is a sectional view similar to FIG. 2 showing the electronic ignition and valve mechanism open, in the temperate operating condition;

FIG. 9 is a sectional view similar to FIG. 3 showing the electronic ignition shut down in the fast heat operating condition.

GENERAL DESCRIPTION

Figure 1:
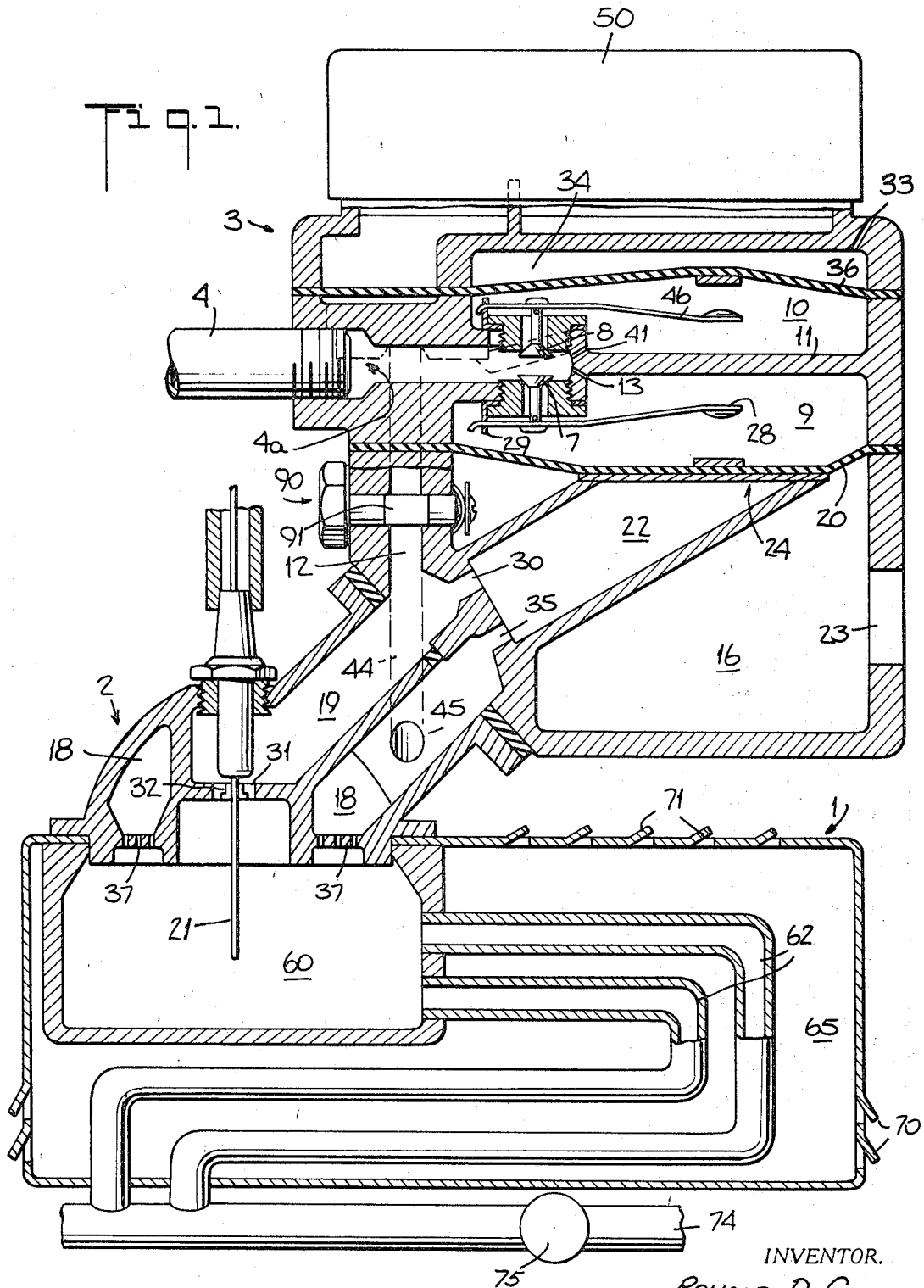
FIG. 1 is a vertical section of the heat generating device of the present invention with the modulating fuel-mixing, and ignition control system in the shut down condition.
Figure 1:

FIG. 1 shows the overall heat generating system of the present invention including a heating apparatus 1, a burner device 2, a fuel mixture control 3 and an electronic ignition circuit and start switch section 50. The system being of the induced draft type is connected to a power exhaust system powered by a suction blower 75 with a heat-exchanger that is connected to an exhaust system 74 that will maintain the heat exchanger flues 62, the combustion chamber 60, the fuel mixing chamber 19, the cooling air chamber 18, the fuel supply conduits 12 and 44 and the air inlet chamber 22 all at sub-atmospheric pressure substantially all of the time. Thus, when combustion occurs in the combustion chamber 60, the combusted gases will be drawn through the flue 62 of the heat exchanger to give off their heat to the surrounding medium within the tank or cabinet 65 which may contain a circulating fluid that enters and exits through the louvres or pipes 70 and 71.

The combustion control system of the present invention is shown at the top of FIG. 1 and is generally contained in the portion 3 above the burner 2. An inlet pipe 4 from the fuel supply communicates with a passage 4a, in the center of the control system housing, which passage is closed by the check valves 7 and 8. Two chambers 9 and 10 are formed in the housing by the wall 11 and the diaphragms 20 and 36. The chambers 16 and 34 on the opposite sides of the diaphragms communicate with atmospheric pressure through the ports 23 and 33. The valves 20 and 7 control the supply of fuel to the burner during tempered operation while the valve 8 is actuated by diaphragm 36 to add fuel to the burner when fast heating is desired.

The diaphragm valve operation will first be described with reference to valve 20 and the lower chamber 9. As will be seen in FIG. 1, chamber 9, when the check valve 7 is closed, will communicate with fuel line pressure through the small bleed port 13. Chamber 16 will be at atmospheric pressure and chamber 22 which is evacuated through the induced draft system will be at sub-atmospheric pressure. The fuel line pressure being above atmospheric will maintain the diaphramg 20 in sealing position over the inlet 24 to chamber 22.

Figure 2:
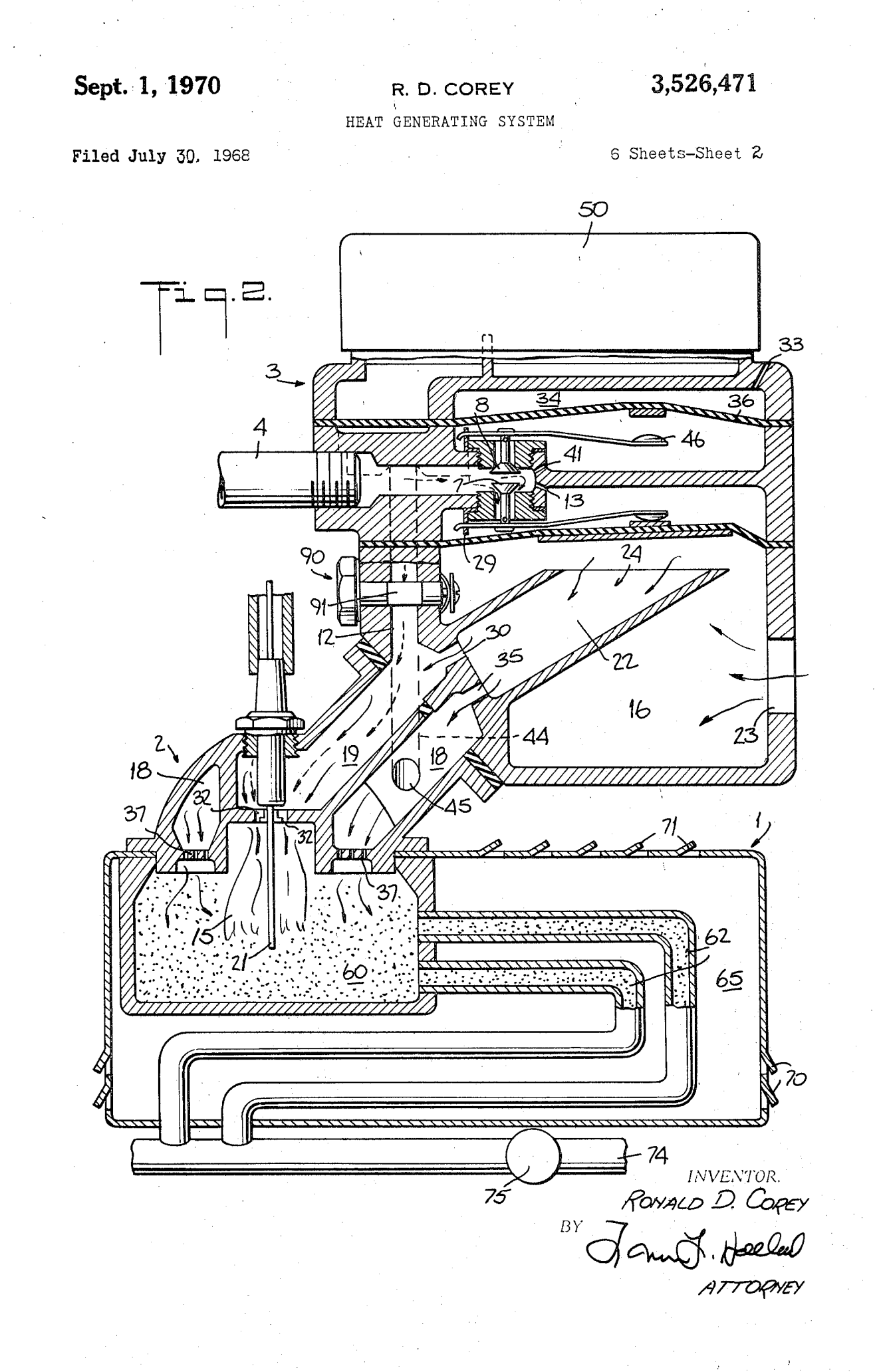

The outlet 25 of chamber 9 which is shown in FIG. 7 and FIG. 8 communicates with a small chamber 26 which is closed, by a suitable electrically operated valve 27, from communication with conduit 12 which leads to the burner mixing chamber 19. When valve 27 is opened the pressure in chamber 9 will be exhausted through outlet 25 and conduit 12. This sudden drop in pressure to below the atmospheric level will cause the diaphragm 20 to be lifted by the atmospheric pressure in chamber 16, opening the inlet 24 as shown in FIGS. 2 and 8. The atmospheric air will now be drawn into the reduced pressure chamber 22 and fed to the burner system.

The upward motion of the diaphragm 20 will shortly thereafter cause it to strike a lever arm 28 which is pivoted about a clip means 29 and opens the fuel pressured check valve 7. Partial opening of the check valve 7 permits a metered amount of fuel from inlet pipe 4 to be drawn through chamber 9 and conduit 12 into the mixing chamber 19.

THE BURNER

The metered fuel from conduit 12 and air passing through the metering orifice 30 from chamber 22 are mixed in the chamber 19 and are drawn by the reduced pressure through the chamber outlet 31. An electrical spark is struck at 32 which ignites the gas mixture flowing through opening 31 as it passes into the combustion chamber 60 producing the heating flame 15 as shown in FIGS. 2 and 8.

The atmospheric air entering chamber 22 also passes through the metering orifice 35 into the auxiliary air chamber 18 of the burner device. The air from this chamber 18 is drawn by the draft through the grille-like openings 37 into the combustion chamber 60. This excess air enters the combustion chamber 60 in the vicinity of the burner flame 15 and mingles with the residual combusted gases thus creating an intermediate temperature residual gas mixture, increasing their volume and flow speed in the chamber and heat exchanger and thereby tempering the intensity of the heat generated within the heat exchanger walls throughout their length. In the event that the spark at gap 32 fails to ignite the fuel and air mixture when it passes into the combustion chamber 60, this excess air also will dilute the mixture sufficiently to render it non-combustible preventing an explosive mixture build-up in the chamber 60 and thereby rendering the device explosion-proof. Also no pilot flame is required as ignition is accomplished by the electric spark.

FAST HEATING FEATURE

The auxiliary air flowing through chamber 18 not only provides a means for tempering the generated heat but also may be used as part of a fast-heat generating system. A fast generating feature in heating devices is desirable for liquid heaters such as hot water heaters, boilers, space heater-coolers, refrigerator-freezers and the like. The present fast-heat system is keyed into operation when flame sensor 21 is in direct contact with the main flame 15. A normally opened switch contained in the section 50 is actuated closed as shown in FIG. 9 thereby establishing a circuit to actuate valve 42 to open passage 44 shown in FIGS. 3–6 and 9.

As seen in FIG. 6 the chamber 10 communicates with a chamber 43 through the passage 40. The chamber 10 is normally at fuel line pressure through the bleed opening 41. When the valve 42 is opened the chamber 10 will be connected with sub-atmospheric pressure through the conduit 44 whose opposite end 45 opens into the auxiliary chamber 17. As shown in FIGS. 3 and 9 when the pressure in chamber 10 drops below atmospheric pressure the diaphragm 36 will be depressed by the atmospheric air in chamber 34 above it and the diaphragm 36 will strike the lever arm 46 causing check valve 8 to partially open admitting a metered amount of fuel into the chamber 10. The fuel is drawn through the chamber 10 and conduit 44 into the auxiliary air chamber 18 where it is mixed with the cooling air which then becomes combustion air and drawn through the openings 37 into the combustion chamber 60. This combustible mixture entering the combustion chamber in close proximity with the main flame 15 is caused to ignite from the main flame producing intense heat generation within the heat exchanger flues 60 and 62.

CONTROL FEATURES

It will be noted that this auxiliary gas supply along with the main combustion flame supply is directly sensitive to fluctuations in both the sub-atmospheric pressure and the fuel line pressure. Variations in these pressures affect the volume of both the fuel and the air and therefore the effective coordination of the fuel to air ratio. The combustion control valves maintain a constant fuel to air ratio automatically irrespective of incoming gas pressures up to 2 p.s.i. The orifices of the fuel adjustors 90 and 95 located in passageway 12 and 44 are about three times the size of an atmospheric burner gas orifice, in order to control the fuel flowing to the mixing chambers 19 and 18. The degree of sub-atmospheric pressure must be sufficient to affect pressure differential within chambers 9 and 10 as against atmospheric pressure in chambers 16 and 34 in order to regulate valves 7 and 8 to govern incoming gas volume. The fuel adjustable passages 91 and 96 being adjusted to permit the two commodities to pass counterdirectionally through passageway 12 and 44 each have a governing effect upon the other. It will be seen if excess gas is permitted to flow into chambers 9 or 10 it will encounter the required degree of vacuum which, in turn, will starve the necessary degree of pressure differential. This will result in a change of the position of the diaphragms 20 and 36 and in that event the fuel line pressure will cause the valves 7 or 8 to nearly close thus restricting flow instantly. The reduction will thus restore pressure differential and re-establish correct flow volume of fuel through the valve system.

A fuel adjustor is disposed in each fuel passageway 12 and 44 and each is set for the particular fuel volume to be used requiring no further adjustment.

With this combined valve system then the amounts of fuel and air being drawn into the burner system will be automatically and directly modulated to maintain a constant given ratio between fuel and air. The modulation is accomplished automatically by purely mechanical means that is sensitive to pressure fluctuation and therefore the system provides automatic shut off in the event that the sub-atmospheric pressure should fail.

Since the air valve 20 is closed during idle periods or when the burner is not in operation, air is prevented from entering the combustion chamber 60 and therefore movement of the residual hot combusted gases is stopped irrespective of the continued existence of the sub-atmospheric pressure or vacuum therein. This feature reduces internal standby heat loss as the residual combusted gas flows downstream during heating periods only and thereafter stops during the inoperative periods. Another essential feature in achieving higher efficiency is the controlled flow speed of the residual hot combusted gases within the heat exchanger permitting more complete heat transfer to the medium being heated. The counterflow downward direction of the moving hot gases in the heat exchanger permits faster heat absorption because of greater temperature differential and the exhaust exit being located at the cold end of the heating apparatus achieves efficiency in the vicinity of 90%. The residual combusted gas temperature is reduced to 150° F. or less at the vent thereby reducing the fuel requirement by about 40% compared to an atmospheric burner heating device.

FIG. 4 shows the arrangement of the various valve parts with reference to the upper chamber 10. The bleed orifice 41 communicates fuel line pressure to the chamber when the valve 8 is closed in the burner shut off condition. When the valve 42 is opened in response to a flame sensor in the combustion chamber, passage 40 will communicate sub-atmospheric pressure drawing the diaphragm 36 inwardly against the modulator lever arm 46. Depression of the modulator arm 46 will partially open the check valve 8 modulating the amount of fuel to pass into the chamber 10 and to be drawn in through the opening 40, valve 42 and passage 44 down to the mixing chamber 18 in the burner. The diaphragm 20 is shown spaced from its actual position in sealing relationship with the underside of the valve chamber housing 3. The top view of the control system shown in FIG. 5 shows the bleed ports 80 and 81 through which fuel line pressure is communicated to the area above the valves 27 and 42 to maintain a pressure balance during the shut off condition.

OPERATION

By way of summary, the overall operation of the control-burner system will now be described. With the burner and the control system in the shut off condition as shown in FIG. 1 any thermostatic device, such as a room thermostat, or other start means may be used to initiate operation of the system. The switching may be contained in the housing 50 on top of the fuel mixer. The switch means will open the valve 27 (FIG. 7 and FIG. 8) communicating the chamber 9, which is at fuel line pressure communicated to it through the bleed port 13 with the conduit 12 which is at sub-atmospheric pressure due to the induced draft produced in the burner 2 and combustion chamber 60 and heat exchanger of a heating apparatus. This drop in pressure in the chamber 9 will cause the atmospheric air in chamber 16 to raise the diaphragm 20 thereby uncovering the inlet 24 to chamber 22 (FIGS. 2 and 8). As chamber 22 is at sub-atmospheric pressure, atmospheric air will be drawn in through the inlet 24. The entering air will be drawn through the metering orifices 30 and 35 into mixing chamber 19 and auxiliary chamber 18. The rising diaphragm 20 immediately thereafter will strike lever arm 28 which is pivoted to open the fuel check valve 7. Partial opening of the check valve 7 regulates the fuel volume to flow through chamber 9 and conduit 12 into the mixing chamber 19 where it is mixed with the air drawn in through metering orifice 30. The fuel and air mixture is drawn down through chamber 19 and is ignited by a spark at gap 32 in the chamber outlet 31. The resulting flame is drawn into the combustion chamber 60 and the generated hot gases pass through the heat exchanger 62 and 111 in FIG. 10 to be exhausted through the exhaust system 74. The excess air drawn through the metering orifice 35 passes downwardly into the combustion chamber through the grilles 37 into the vicinity of the flame to temper the temperature of the residual combusted gas mixture and to render the incoming combustible gases noncombustible in the event that the spark fails to ignite them. This tempering also prevents excessive "hot spots" on the combustion chamber walls.

When it is desired to rapidly heat up the heat exchanger conduits, an auxiliary combustible mixture is provided which is controlled by the upper diaphragm 36. After the main combustible gas is ignited the resulting flame in the combustion chamber will be in contact with flame sensor rod 21 which will cause valve 42 (FIGS. 9 and 6) to open the passage between chamber 10 which has been maintained at fuel line pressure with the conduit 44 whose lower end opens into the auxiliary chamber 18 at sub-atmospheric pressure. The exhausting of the pressure in chamber 10 will draw the diaphragm 36 downwardly striking lever arm 46 which pivots to partially open the check valve 8 (FIGS. 3 and 9). The opening of this check valve will then regulate fuel volume through the chamber 10 and the conduit 44 into the auxiliary chamber 18. This fuel is mixed with the excess air coming through metering orifice 35 and the resulting combustible mixture is drawn through the grilles 37 into the combustion chamber 60. This combustible mixture will be ignited by the flame in the chamber and produce rapid intense heat generation. The intensely heated gases will then be drawn through the heat exchanger flues 62 and 111 to the exhaust system 74. Any fluctuation in the induced draft sub-atmospheric pressure or in the fuel line pressure will be sensed by the diaphragms 20 and 36 so that, for example, if the pressure should rise in the burner system the accompanying rise in the pressure in the chambers 10 and 9 will cause the diaphragms to release their force on the check valve modulators 7 and 8 decreasing the amount of fuel being supplied to the mixing chambers.

It will thus be seen that an improved new burner and control system is provided by the present invention which is extremely safe and efficient. In addition, the controls automaticaly modulate the ratio of the fuel and air mixture in proportion to the magnitude of the induced draft by simple mechanical means and the burner may be operated in a temperate or fast heat generating condition as desired.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A combustible gas mixer and burner comprising a first chamber normally in communication with fuel line pressure, first valve means in a flexible diaphragm wall of said chamber, a second chamber normally in communication with means for producing sub-atmospheric pressure therein and having an orifice adjacent to and adapted to be closed by said first valve means under normal conditions, second valve means adapted to admit fuel into said first chamber, said first valve means being adapted to open said orifice and said second valve means in response to a drop in pressure below atmospheric in said first chamber, a third chamber normally in communication with fuel line pressure, flexible diaphragm in a wall of said chamber, third valve means adapted to admit fuel into said chamber, said diaphragm being adapted to open said third valve in response to a drop in pressure below atmospheric in said third chamber, a fourth chamber communicating with said first and second chambers and at sub-atmospheric pressure whereby fuel and air are drawn in and mixed therein when said first and second valves are open and means at an exit orifice in said fourth chamber for igniting said mixture of fuel and air.

2. A control system as claimed in claim 1 comprising a fifth chamber at sub-atmospheric pressure communicating with said second chamber and having an exit orifice adjacent said exit orifice in said fourth chamber whereby when said first valve is opened air is drawn through said fifth chamber into the vicinity of the ignited mixture.

3. A control system as claimed in claim 2 wherein said fifth chamber communicates with said second and third chambers and is at sub-atmospheric pressure whereby fuel and air are drawn in and mixed therein when said first and third valves are opened.

4. A control system as claimed in claim 3 including valve means for communicating said first chamber and said fourth chamber to initiate burner operation.

5. A control system as claimed in claim 4 including valve means for communicating said third chamber and said fifth chamber to initiate the fast heating operation.

6. A control system as claimed in claim 4 wherein the opening of said first valve means opens said orifice and said second valve means in unison.

7. A control system as claimed in claim 6 wherein the closing of said first valve means closes said orifice and said second valve means in unison.

8. A control system as claimed in claim 7 wherein said first valve means comprises a diaphragm.

9. A control system as claimed in claim 8 wherein said diaphragm is disposed between said first chamber communicating with the fuel supply and a chamber communicating with the atmosphere and has a portion closing the orifice of said second chamber at sub-atmospheric pressure when the burner is not operating.

10. A control system as claimed in claim 9 wherein said second valve means comprises a check valve, a lever arm connected to said check valve, spring means acting on said lever arm to normally hold said check valve closed and adapted to yield proportionately in response to the pressing of said diaphragm against said lever arm.

11. A heating system comprising a first chamber normally in communication with fuel line pressure, first valve means in a wall of said chamber, a second chamber normally in communication with means for producing sub-atmospheric pressure therein and having an orifice adjacent to and adapted to be closed by said first valve means under normal conditions, second valve means adapted to admit fuel into said first chamber and said first valve means being adapted to open said orifice and said second valve means in response to a drop in pressure below atmospheric in said first chamber, a third chamber in communication with said first and second chambers and at sub-atmospheric pressure to draw in fuel from said first chamber and air entering through said orifice for mixing therein, a fourth chamber communicating with said third chamber and at sub-atmospheric pressure to draw the fuel and air mixture from said third chamber, means for igniting the mixture as it leaves said third chamber, a fifth chamber communicating with said second chamber and with said fourth chamber and adapted to supply air to said fourth chamber in the vicinity of said ignited mixture.

12. A heating system as claimed in claim 11 which comprises a passageway connected to the fourth chamber and positioned substantially below it and having means for producing sub-atmospheric pressure therein for drawing the gases resulting from the ignited mixture downwardly to exhaust.

13. A heating system comprising a first chamber normally in communication with fuel line pressure, first valve means in a wall of said chamber, a second chamber normally in communication with means for producing sub-atmospheric pressure therein and having an orifice adjacent to and adapted to be closed by said first valve means under normal conditions, second valve means adapted to admit fuel into said first chamber and said first valve means being adapted to open said orifice and said second valve means in response to a drop in pressure below atmospheric in said first chamber, a third chamber in communication with said first and second chambers and at sub-atmospheric pressure to draw in fuel from said first chamber and air entering through said orifice for mixing therein, a fourth chamber communicating with said third chamber and at sub-atmospheric pressure to draw the fuel and air mixture from said third chamber, means for igniting the mixture as it leaves said third chamber, a fifth chamber communicating with said second chamber and with said fourth chamber and adapted to supply air to said fourth chamber in the vicinity of said ignited mixture, and a passageway connected to the fourth chamber and positioned substantially below it and having an induced draft therein for drawing the gases resulting from the ignited mixture downwardly to exhaust.

14. A control system as claimed in claim 13 wherein said fifth chamber communicates with said second and forth chambers and is at sub-atmoshperic pressure whereby fuel and air are drawn in and mixed therein when said first and forth valves are opened.

15. A control system as claimed in claim 14 including valve means for communicating said first chamber and said third chamber to initiate burner operation.

16. A control system as claimed in claim 15 including a sixth chamber having valve means communicating with said fuel pressure line, valve means for communicating said sixth chamber and said fifth chamber to initiate the fast heating operation.

17. A combustible gas mixer and burner comprising a first chamber normally in communication with fuel line pressure, first valve means in a flexible diaphragm wall of said chamber, a second chamber normally in communication with means for producing sub-atmospheric pressure therein and having an orifice adjacent to and adapted to be closed by said first valve means under normal conditions, second valve means adapted to admit fuel into said first chamber, said first valve means being adapted to open said orifice and said second valve means in response to a drop in pressure below atmospheric in said first chamber, a mixing chamber communicating with said first and second chambers and at sub-atmospheric pressure whereby fuel and air are drawn in and mixed therein when said first and second valves are open and means at an exit orifice in said mixing chamber for igniting said mixture of fuel and air.

References Cited
UNITED STATES PATENTS

| | | | |
|---|---|---|---|
| 2,373,326 | 4/1945 | Miller | 431—19 |
| 2,495,481 | 1/1950 | Riehl | 431—19 X |
| 3,115,302 | 12/1963 | Corey | 237—2 |

CARROLL B. DORITY, JR., Primary Examiner

U.S. Cl. X.R.

137—99; 431—60